United States Patent
Kato et al.

(10) Patent No.: US 7,439,311 B2
(45) Date of Patent: Oct. 21, 2008

(54) ANTI-FOULING AGENT AND METHOD FOR PRODUCING THE SAME

(75) Inventors: Masaki Kato, Kurashiki (JP); Kazuyuki Somemiya, Kurashiki (JP); Takeshi Kusudou, Kurashiki (JP); Naoki Fujiwara, Chiyoda-ku (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/016,479

(22) Filed: Jan. 18, 2008

(65) Prior Publication Data

US 2008/0119623 A1 May 22, 2008

Related U.S. Application Data

(62) Division of application No. 11/013,402, filed on Dec. 17, 2004, now abandoned.

(30) Foreign Application Priority Data

Jan. 7, 2004 (JP) .............................. 2004-002464

(51) Int. Cl.
*C08F 14/16* (2006.01)
*C08F 2/00* (2006.01)
*C08F 20/14* (2006.01)
*C08F 30/08* (2006.01)
*C08C 19/36* (2006.01)

(52) U.S. Cl. .................. 526/74; 526/344; 526/344.1; 526/344.2; 525/326.5; 525/330.3; 525/383

(58) Field of Classification Search .............. 526/74, 526/344, 344.1, 344.2; 525/330.3, 326.5, 525/383
See application file for complete search history.

(56) References Cited

U.S. PATENT DOCUMENTS 4,567,221 A 1/1986 Maruyama et al.

| | | | |
|---|---|---|---|
| 6,635,709 B2 | 10/2003 | Kato et al. | |
| 6,806,305 B2 | 10/2004 | Kato et al. | |
| 6,962,955 B2 | 11/2005 | Kusudou et al. | |
| 2004/0009357 A1 | 1/2004 | Kusudou et al. | |
| 2004/0054069 A1 | 3/2004 | Kusudou et al. | |
| 2004/0152834 A1 | 8/2004 | Kato et al. | |

FOREIGN PATENT DOCUMENTS

| EP | 1 380 600 | | 1/2004 |
|---|---|---|---|
| JP | 59-184208 | * | 10/1984 |

* cited by examiner

*Primary Examiner*—Roberto Rábago
(74) *Attorney, Agent, or Firm*—Oblon, Spivak, McClelland, Maier & Neustadt, P.C.

(57) ABSTRACT

The present invention provides a method for producing a polymer by conducting polymerization in a polymerization reactor having an inner wall covered with an anti-fouling agent comprising an aqueous solution containing a polyvinyl alcohol obtained through saponification of a polyvinyl ester that contains monomer units having a silyl group. In the present invention, the polyvinyl alcohol satisfies the following formulae (I) and (II):

$$370 < P \times S < 9000 \quad \text{(I)}$$

where P indicates the viscosity-average degree of polymerization of the polyvinyl alcohol, and S indicates the content (mole %) of the monomer units having a silyl group of formula (1) in the polyvinyl alcohol;

$$0.2/100 \leq (A-B)/(B) \leq 75/100 \quad \text{(II)}$$

where A indicates the content (ppm) of silicon atoms in the polyvinyl alcohol, and B indicates the content (ppm) of silicon atoms in the polyvinyl alcohol that was washed with sodium hydroxide-containing methanol and then washed with methanol by Soxhlet extraction.

11 Claims, No Drawings

ANTI-FOULING AGENT AND METHOD FOR PRODUCING THE SAME

CROSS-REFERENCE TO RELATED APPLICATIONS

The present application is a divisional of U.S. Ser. No. 11/013,402, filed on Dec. 17, 2004, now abandoned, and claims priority to JP 2004-002464, filed on Jan. 7, 2004.

BACKGROUND OF THE INVENTION

1. Field of the Invention

The present invention relates to an anti-fouling agent, especially, an anti-fouling agent comprising an aqueous solution containing a polyvinyl alcohol.

Moreover, the present invention relates also to a method for producing the anti-fouling agent and to a method for producing a polymer using the anti-fouling agent.

2. Description of the Related Art

Heretofore, when vinyl chloride is polymerized alone or copolymerized with a monomer copolymerizable therewith in an aqueous medium by suspension polymerization, polymer scale deposits on the inner wall of a polymerization reactor, the surface of a stirring blade, the surface of a baffle, the inner wall of a pipe mounted in the polymerization reactor, the inner wall of a condenser and so on. The deposition of scale has resulted, for example, in decrease in cooling capacity of the polymerization reactor and deterioration of the quality of products caused by exfoliation and contamination of the depositions. Thus, the inner wall of a polymerization reactor must be cleaned every time polymerization has finished and this has caused the decrease in the operating rate of polymerization reactors and the increase in production cost. To solve these problems, the method of applying various kinds of anti-fouling agents onto the inner walls of polymerization reactors in advance has been proposed. JP-A 59-184208 discloses a method using a silanol-modified polyvinyl alcohol as an anti-fouling agent, but its effect of preventing the adhesion of scale is still insufficient.

SUMMARY OF THE INVENTION

The present invention was made for solving the above-mentioned problems. The object of the present invention is to provide an anti-fouling agent which is superior in viscosity stability, water resistance of its film and ability of preventing a scale from depositing on the inner wall of a polymerization reactor and which can prevent the contamination of foreign substances into a polymeric product caused by exfoliation of a scale deposited on the inner wall of a polymerization reactor and exfoliation of the anti-fouling agent itself. Another object of the present invention is to provide a method for producing such an anti-fouling agent and a method for producing a polymer using the agent.

The above problems can be solved by providing an anti-fouling agent comprising an aqueous solution containing a polyvinyl alcohol obtained through saponification of a polyvinyl ester that contains monomer units having a silyl group of formula (1):

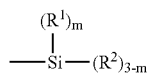
(1)

wherein $R^1$ represents an alkyl group having from 1 to 5 carbon atoms; $R^2$ represents an alkoxyl or acyloxyl group optionally having an oxygen-containing substituent; and m indicates an integer of from 0 to 2, wherein the polyvinyl alcohol satisfies the following formulae (I) and (II):

$$370 < P \times S < 9000 \qquad (I)$$

wherein P indicates the viscosity-average degree of polymerization of the polyvinyl alcohol, and S indicates the content (mole %) of the monomer units having a silyl group of formula (1) in the polyvinyl alcohol;

$$0.2/100 \leq (A-B)/(B) \leq 75/100 \qquad (II)$$

wherein A indicates the content (ppm) of silicon atoms in the polyvinyl alcohol, and B indicates the content (ppm) of silicon atoms in the polyvinyl alcohol that was washed with sodium hydroxide-containing methanol and then washed with methanol by Soxhlet extraction, wherein A and B are measured by ICP emission spectrometry after ashing of a sample.

The aqueous solution preferably has a pH of from 10 to 14. The content of the polyvinyl alcohol is preferably from 0.1 to 10% by weight.

The above-mentioned problems can be solved also by providing a method for producing an anti-fouling agent wherein the method comprises obtaining a polyvinyl alcohol satisfying formulae (I) and (II) defined below by saponifying a polyvinyl ester that contains monomer units having a silyl group of formula (1) above and then preparing an aqueous solution by dissolving the polyvinyl alcohol in water. In one preferred embodiment, the polyvinyl alcohol is obtained by saponifying said polyvinyl ester, subsequently neutralizing a remaining saponification catalyst, and then subjecting to a heat treatment in an organic solvent. It is desirable that the organic solvent is used in an amount of from 1 to 20 times the weight of the polyvinyl alcohol during the heat treatment. It is also desirable that the organic solvent is a mixed solvent of a lower alcohol and a lower fatty acid ester. It is also desirable that the treatment temperature is from 40° C. to 100° C. and the treatment time is from 30 minutes to 10 hours in said heat treatment. It is also desirable that the polyvinyl alcohol and a base are dissolved in water.

The above-mentioned problems can be solved also by providing a method for producing a polymer wherein polymerization is conducted using a polymerization reactor having an inner wall covered with the anti-fouling agent described above. It is desirable that the polymerization is suspension polymerization or emulsion polymerization. It is also desirable that the polymer is polyvinyl chloride.

In addition, the above-mentioned problems can be solved also by providing a polyvinyl alcohol for anti-fouling agents wherein the polyvinyl alcohol is obtained through saponification of a polyvinyl ester having monomer units that contains monomer units having a silyl group of formula (1) above and wherein the polyvinyl alcohol satisfies the aforementioned formulae (I) and (II).

The anti-fouling agent of the present invention is superior in viscosity stability, water resistance of its film and ability of preventing a scale from depositing on the inner wall of a polymerization reactor and can prevent the contamination of foreign substances into a polymeric product caused by exfoliation of a scale depositing on the inner wall of a polymerization reactor and exfoliation of the anti-fouling agent itself.

DESCRIPTION OF THE PREFERRED EMBODIMENTS

The polyvinyl alcohol used in the anti-fouling agent of the present invention is a polyvinyl alcohol obtained through saponification of a polyvinyl ester that contains monomer units having a silyl group of formula (1):

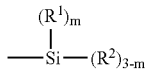
(1)

wherein $R^1$ represents an alkyl group having from 1 to 5 carbon atoms; $R^2$ represents an alkoxyl or acyloxyl group optionally having an oxygen-containing substituent; and m indicates an integer of from 0 to 2. The polyvinyl alcohol must satisfy the following formulae (I) and (II):

$$370 < P \times S < 9000 \quad (I)$$

wherein P indicates the viscosity-average degree of polymerization of the polyvinyl alcohol, and S indicates the content (mole %) of the monomer units having a silyl group of formula (1) in the polyvinyl alcohol;

$$0.2/100 \leq (A-B)/(B) \leq 75/100 \quad (II)$$

wherein A indicates the content (ppm) of silicon atoms in the polyvinyl alcohol, and B indicates the content (ppm) of silicon atoms in the polyvinyl alcohol that was washed with sodium hydroxide-containing methanol and then washed with methanol by Soxhlet extraction, wherein A and B are measured by ICP emission spectrometry after ashing of a sample.

In formula (1), which represents a silyl group contained in the polyvinyl alcohol, $R^1$ represents an alkyl group having from 1 to 5 carbon atoms; $R^2$ represents an alkoxyl or acyloxyl group optionally having an oxygen-containing substituent; and m indicates an integer of from 0 to 2.

Examples of the alkyl group having from 1 to 5 carbon atoms represented by $R^1$ include a methyl, ethyl, n-propyl, isopropyl, n-butyl, sec-butyl, tert-butyl, isobutyl, n-pentyl, tert-pentyl and isopentyl groups. Examples of the alkoxyl group represented by $R^2$ include a methoxy, ethoxy, propoxy, isopropoxy, butoxy, tert-butoxy, pentoxy, hexyloxy, octyloxy, lauryloxy and oleyloxy groups. The acyloxyl group includes, for example, an acetoxy and propionyloxy groups. The alkoxyl or acyloxy group may have an oxygen-containing substituent, the examples of which include alkoxyl groups such as methoxy and ethoxy.

The polyvinyl alcohol may be produced by copolymerizing a vinyl ester monomer with a monomer having a silyl group of formula (1) and then saponifying the resulting polyvinyl ester.

Alternatively, the polyvinyl alcohol can also be produced by copolymerizing a vinyl ester monomer with a monomer having a silyl group of formula (1) in the presence of a thiol compound such as 2-mercaptoethanol, n-dodecylmercaptan, mercaptoacetic acid and 3-mercaptopropionic acid and then saponifying the resulting polyvinyl ester. These methods give a polyvinyl alcohol having a functional group derived from a thiol compound as a terminal group.

Examples of the vinyl ester monomer used in the production of the polyvinyl alcohol include vinyl formate, vinyl acetate, vinyl propionate, vinyl valerate, vinyl caprylate, vinyl laurate, vinyl stearate, vinyl benzoate, vinyl pivalate and vinyl versatate. Vinyl acetate is particularly preferred.

Examples of the monomer having a silyl group of formula (1) used for the radical copolymerization with the vinyl ester monomer include compounds represented by the following formula (2) or (3):

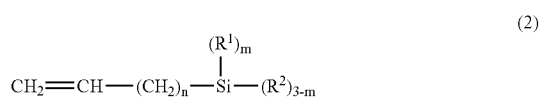
(2)

wherein $R^1$ represents an alkyl group having from 1 to 5 carbon atoms; $R^2$ represents an alkoxyl or acyloxyl group optionally having an oxygen-containing substituent; m indicates an integer of from 0 to 2; and n indicates an integer of from 0 to 4,

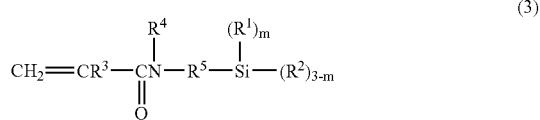
(3)

wherein $R^1$ represents an alkyl group having from 1 to 5 carbon atoms; $R^2$ represents an alkoxyl or acyloxyl group optionally having an oxygen-containing substituent; $R^3$ represents a hydrogen atom or a methyl group; $R^4$ represents a hydrogen atom or an alkyl group having from 1 to 5 carbon atoms; $R^5$ represents an alkylene group having from 1 to 5 carbon atoms or a divalent hydrocarbon group containing an oxygen or nitrogen atom; and m indicates an integer of from 0 to 2.

In formulae (2) and (3), examples of the alkyl group having from 1 to 5 carbon atoms represented by $R^1$ include a methyl, ethyl, n-propyl, isopropyl, n-butyl, sec-butyl, tert-butyl, isobutyl, n-pentyl, tert-pentyl and isopentyl groups. Examples of the alkoxyl group represented by $R^2$ include a methoxy, ethoxy, propoxy, isopropoxy, butoxy, tert-butoxy, pentoxy, hexyloxy, octyloxy, lauryloxy and oleyloxy groups. The acyloxyl group includes, for example, an acetoxy and propionyloxy groups. The alkoxyl or acyloxy group may have an oxygen-containing substituent, the examples of which include alkoxyl groups such as methoxy and ethoxy. Examples of the alkyl group having from 1 to 5 carbon atoms represented by $R^4$ include a methyl, ethyl, n-propyl, isopropyl, n-butyl, sec-butyl, tert-butyl, isobutyl, n-pentyl, tert-pentyl and isopentyl groups. Examples of the alkylene group having from 1 to 5 carbon atoms represented by $R^5$ include a methylene, ethylene, dimethylethylene, trimethylene, tetramethylene and pentamethylene groups. Examples of the divalent hydrocarbon group containing an oxygen or nitrogen atom include —$CH_2CH_2NHCH_2CH_2CH_2$—, —$CH_2CH_2NHCH_2CH_2$—, —$CH_2CH_2NHCH_2$—, —$CH_2CH_2N(CH_3)CH_2CH_2$—, —$CH_2CH_2N(CH_3)CH_2$—, —$CH_2CH_2OCH_2CH_2CH_2$—, —$CH_2CH_2OCH_2CH_2$—, and —$CH_2CH_2OCH_2$—.

Examples of the monomer represented by formula (2) include vinyltrimethoxysilane, vinylmethyldimethoxysilane, vinyldimethylmethoxysilane, vinyltriethoxysilane, vinylmethyldiethoxysilane, vinyldimethylethoxysilane, allyltrimethoxysilane, allylmethyldimethoxysilane, allyldimethylmethoxysilane, allyltriethoxysilane, allylmethyldiethoxysilane, allyldimethylethoxysilane, vinyltris(β-methoxyethoxy)silane, vinylisobutyldimethoxysilane, vinylethyldimethoxysilane, vinylmethoxydibutoxysilane, vinyldimethoxybutoxysilane, vinyltributoxysilane, vinylmethoxydihexyloxysilane, vinyldimethoxyhexyloxysilane, vinyltrihexyloxysilane, vinylmethoxydioctyloxysilane, vinyldimethoxyoctyloxysilane, vinyltrioctyloxysilane, vinylmethoxydilauryloxysilane, vinyldimethoxylauryloxysilane, vinylmethoxydioleyloxysilane, and vinyldimethoxyoleyloxysilane.

When a silyl group-having monomer of formula (2) where n is 1 or more is copolymerized with a vinyl ester monomer, the degree of polymerization of the resulting polyvinyl ester may lower. On the other hand, vinyltrimethoxysilane can be favorably employed because when it is copolymerized with a vinyl ester monomer, the lowering of the degree of polymerization of the resulting polyvinyl ester is suppressed. And industrial production of vinyltrimethoxysilane is easy, therefore, vinyltrimethoxysilane is obtainable at low cost.

Examples of the monomer of formula (3) include 3-(meth)acrylamido-propyltrimethoxysilane, 3-(meth)acrylamido-propyltriethoxysilane, 3-(meth)acrylamido-propyltri(β-methoxyethoxy)silane, 2-(meth)acrylamido-ethyltrimethoxysilane, 1-(meth)acrylamido-methyltrimethoxysilane, 2-(meth)acrylamido-2-methylpropyltrimethoxysilane, 2-(meth)acrylamido-isopropyltrimethoxysilane, N-(2-(meth)acrylamido-ethyl)-aminopropyltrimethoxysilane, (3-(meth)acrylamido-propyl)-oxypropyltrimethoxysilane, 3-(meth)acrylamido-propyltriacetoxysilane, 2-(meth)acrylamido-ethyltriacetoxysilane, 4-(meth)acrylamido-butyltriacetoxysilane, 3-(meth)acrylamido-propyltripropionyloxysilane, 2-(meth)acrylamido-2-methylpropyltriacetoxysilane, N-(2-(meth)acrylamido-ethyl)-aminopropyltriacetoxysilane, 3-(meth)acrylamido-propylisobutyldimethoxysilane, 2-(meth)acrylamido-ethyldimethylmethoxysilane, 3-(meth)acrylamido-propylmethyldiacetoxysilane, 2-(meth)acrylamido-2-methylpropylhydrogendimethoxysilane, 3-(N-methyl-(meth)acrylamido)-propyltrimethoxysilane, and 2-(N-ethyl-(meth)acrylamido)-ethyltriacetoxysilane.

Among these monomers, 3-(meth)acrylamido-propyltrimethoxysilane and 3-(meth)acrylamido-propyltriacetoxysilane can be favorably employed because their industrial production is relatively easy and it is obtainable at low cost. Moreover, 2-(meth)acrylamido-2-methylpropyltrimethoxysilane and 2-(meth)acrylamido-2-methylpropyltriacetoxysilane can be favorably employed because their amide bond is extremely stable to acid or alkali.

By copolymerizing a monomer of formula (2) with a vinyl ester monomer, a polyvinyl ester having monomer units of formula (4) shown below is obtained. The polyvinyl ester is converted to a polyvinyl alcohol according to the method described below. The polyvinyl alcohol used in the present invention desirably is a polyvinyl alcohol having monomer units represented by the following formula (4):

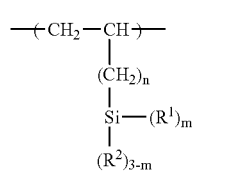

(4)

wherein $R^1$ represents an alkyl group having from 1 to 5 carbon atoms; $R^2$ represents an alkoxyl or acyloxyl group optionally having an oxygen-containing substituent; m indicates an integer of from 0 to 2; and n indicates an integer of from 0 to 4.

By copolymerizing a monomer represented by formula (3) shown above with a vinyl ester monomer, a polyvinyl ester containing monomer units represented by formula (5) shown below is obtained. The polyvinyl ester is converted to a polyvinyl alcohol according to the method described below. The polyvinyl alcohol used in the present invention desirably is a polyvinyl alcohol having monomer units represented by the following formula (5):

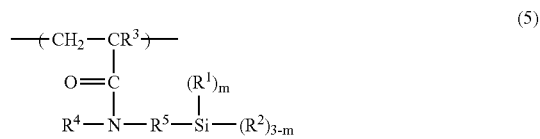

(5)

wherein $R^1$ represents an alkyl group having from 1 to 5 carbon atoms; $R^2$ represents an alkoxyl or acyloxyl group optionally having an oxygen-containing substituent; $R^3$ represents a hydrogen atom or a methyl group; $R^4$ represents a hydrogen atom or an alkyl group having from 1 to 5 carbon atoms; $R^5$ represents an alkylene group having from 1 to 5 carbon atoms or a divalent hydrocarbon group containing an oxygen or nitrogen atom; and m indicates an integer of from 0 to 2.

Examples of the method for copolymerizing a silyl group-having monomer with a vinyl ester monomer include known methods such as bulk polymerization, solution polymerization, suspension polymerization and emulsion polymerization. Among these methods, generally employed is bulk polymerization conducted in the absence of solvent or solution polymerization conducted in a solvent such as alcohol. When the copolymerization is conducted using solution polymerization, examples of the alcohol used as a solvent include lower alcohols such as methyl alcohol, ethyl alcohol and propyl alcohol. Examples of the initiator used for the copolymerization include known initiators such as azo-type initiators e.g. 2,2'-azobisisobutyronitrile, 2,2'-azobis(2,4-dimethylvaleronitrile), 1,1'-azobis(cyclohexane-1-carbonitrile) and 2,2'-azobis(N-butyl-2-methylpropionamide); and peroxide initiators e.g. benzoyl peroxide and n-propyl peroxycarbonate. The polymerization temperature at which the copolymerization is conducted is not specifically restricted, but appropriately is set within the range from 5° C. to 180° C.

When a silyl group-having monomer is radical-copolymerized with a vinyl ester monomer, other copolymerizable monomers may, if desired, also be copolymerized unless the effect of the present invention is affected. Examples of such monomers include α-olefins such as ethylene, propylene, 1-butene, isobutene and 1-hexene; carboxylic acids and their derivatives such as fumaric acid, maleic acid, itaconic acid, maleic anhydride and itaconic anhydride; acrylic acid and its salts; acrylates such as methyl acrylate, ethyl acrylate, n-propyl acrylate and isopropyl acrylate; methacrylic acid and its salts; methacrylates such as methyl methacrylate, ethyl methacrylate, n-propyl methacrylate and isopropyl methacrylate; acrylamide and acrylamide derivatives such as N-methylacrylamide and N-ethylacrylamide; methacrylamide and methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether;

hydroxy group-having vinyl ethers such as ethylene glycol vinyl ether, 1,3-propanediol vinyl ether and 1,4-butanediol vinyl ether; allyl acetate and isopropenyl acetate; allyl ethers such as propyl allyl ether, butyl allyl ether and hexyl allyl ether; monomers having an oxyalkylene group; α-olefins having a hydroxy group such as 3-buten-1-ol, 4-penten-1-ol, 5-hexen-1-ol, 7-octen-1-ol, 9-decen-1-ol and 3-methyl-3-buten-1-ol; monomers having a sulfonic acid group such as ethylenesulfonic acid, allylsulfonic acid, methallylsulfonic acid and 2-acrylamido-2-methylpropanesulfonicacid; and-monomershaving a cationic group such as vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride, dimethylallylamine and allylethylamine. The amount of such a monomer to be used for the copolymerization which is copolymerizable with both of a silyl group-having monomer and a vinyl ester monomer varies depending on the object of its use and the application of the resulting copolymer, but it generally is up to 20 mole %, preferably up to 10 mole % of the total amount of all the monomers to be used for the copolymerization.

The polyvinyl ester obtained through the copolymerization of a silyl group-having monomer and a vinyl ester monomer is then saponified in a solvent according to a known method, thereby forming a polyvinyl alcohol.

As a catalyst for the saponification of the polyvinyl ester, an alkaline substance is generally used. Examples thereof include alkali metal hydroxide such as potassium hydroxide and sodium hydroxide; and alkali metal alkoxides such as sodium methoxide. The amount of the alkaline substance used is preferably within the range of from 0.004 to 0.5, more preferably within the range of from 0.005 to 0.05 in terms of the molar ratio thereof to the vinyl ester monomer units in the polyvinyl ester. The saponification catalyst may be added to the reaction system all at a time in the initial stage of the saponification, or may be added thereto in such a manner that a part thereof is added in the initial stage of the saponification and the remaining part thereof is added during the saponification.

Examples of a solvent usable for the saponification include methanol, methyl acetate, dimethylsulfoxide, diethylsulfoxide and dimethylformamide. Among these solvents, methanol is preferably employed. In its use, the water content thereof is preferably adjusted to 0.001-1% by weight, more preferably 0.003-0.9% by weight, even more preferably 0.005-0.8% by weight.

The saponification is conducted preferably at a temperature of from 5 to 80° C., more preferably from 20 to 70° C. The time required for the saponification is preferably from 5 minutes to 10 hours, more preferably from 10 minutes to 5 hours. The saponification may be conducted either batchwise or continuously. After the completion of the saponification, the remaining catalyst may, if desired, be neutralized. Examples of usable neutralizing agents include organic acids such as acetic acid and lactic acid; and ester compounds such as methyl acetate.

There is no particular limitation on the degree of saponification of the polyvinyl alcohol used in the present invention. It, however, is preferably at least 80 mole %, more preferably at least 85 mole %, and even more preferably at least 90 mole %. From the viewpoint of forming a film of good water resistance containing a polyvinyl alcohol and an inorganic substance, the optimum degree of saponification of the polyvinyl alcohol is at least 95 mole %.

The viscosity-average degree of polymerization (P) of the polyvinyl alcohol used in the present invention is determined according to JIS K6726. Specifically, a polyvinyl alcohol having a silyl group is resaponified so as to have a degree of saponification of at least 99.5 mole % and subsequently refined. The product is measured for its intrinsic viscosity [η] in water at 30° C. The viscosity-average degree of polymerization (P) can be determined based on the intrinsic viscosity [η] (dL/g) according to the following formula:

$$P=([\eta]\times 1000/8.29)^{(1/0.62)}$$

In the polyvinyl alcohol used in the present invention, the content (S:mole %) of silyl group-having monomers is determined based on the $^1$H-NMR spectrum of the corresponding polyvinyl ester before saponification. Prior to the $^1$H-NMR analysis, the polyvinyl ester before saponification is purified by reprecipitation from hexane-acetone to completely remove the unreacted silyl group-having monomer from the polymer, and then the resulting polymer is dried at 90° C. under reduced pressure for 2 days, dissolved in $CDCl_3$ and thereafter subjected to the analysis.

The polyvinyl alcohol used in the present invention must satisfy the relationship 370<P×S<9000, wherein (P×S) is the product of the viscosity-average degree of polymerization (P) of the polyvinyl alcohol and the content (S) of the silyl group-having monomer. Preferably, the product P×S satisfies the relationship 390<P×S<8950, more preferably 390<P×S<8900. It is undesirable that P×S is 370 or less because it may result in a poor water resistance of a film formed of the silyl group-containing PVA and a reduced effect of preventing the adhesion of scale. It is also undesirable that P×S is 9000 or more because it may lead to an extremely high viscosity of an aqueous solution, resulting in a reduced handleability thereof.

The polyvinyl alcohol used in the invention must satisfy the following formula:

$$0.2/100 \leq (A-B)/(B) \leq 75/100 \quad (II)$$

wherein A indicates the silicon atom content (ppm) of the polyvinyl alcohol, B indicates the silicon atom content (ppm) of the polyvinyl alcohol that was washed with sodium hydroxide-containing methanol and then washed with methanol by Soxhlet extraction.

In the determination of the silicon atom content (B), one standard method of washing the polyvinyl alcohol comprises repeating five times an operation of washing the polymer with sodium hydroxide-containing methanol (specifically, an operation comprising adding 10 parts by weight of a sodium hydroxide-containing methanol solution to one part by weight of the polyvinyl alcohol so that the molar ratio of sodium hydroxide to the vinyl alcohol monomer units of the polyvinyl alcohol be 0.01, then boiling the resulting mixture for one hour and separating the polymer by filtration), and then subjecting the thus-washed polymer to Soxhlet extraction with methanol for one week. In the washing method, the washing operation with sodium hydroxide-containing methanol and the Soxhlet extraction with methanol are repeated or continued until almost no change is found in the silicon atom content of the thus-processed polyvinyl alcohol. Therefore, as far as this condition is satisfied, the repetition number of the washing operation with sodium hydroxide-containing methanol and the duration of the Soxhlet extraction with methanol may be suitably changed.

The silicon atom content (A) of the polyvinyl alcohol is assumed to indicate the content of all the silicon atoms contained in the polyvinyl alcohol. On the other hand, the silicon atom content (B) of the polyvinyl alcohol that was washed with sodium hydroxide-containing methanol and then washed with methanol by Soxhlet extraction is assumed to indicate the content of the silicon atoms derived from the silyl group-containing monomers incorporated directly in the main chain of the polyvinyl alcohol.

Before the determination of the silicon atom content (B), the polyvinyl alcohol is washed with sodium hydroxide-containing methanol. Siloxane bonds (—Si—O—Si—) are broken during the washing treatment. During this treatment, the silyl group-having monomers that are not incorporated directly in the main chain of the polyvinyl alcohol but are bonded to the main chain via a siloxane bond are cut away from the polyvinyl alcohol and removed from the polymer. Therefore, the silicon atom content (B) of the polyvinyl alcohol is assumed to indicate the silicon atom content of a polyvinyl alcohol after the silyl group-having monomers not incorporated directly in the main chain of the polymer has been removed. Accordingly, the (A–B) in the above-mentioned formula (II) is assumed to indicate the content of the silyl groups derived from the silyl group-having monomers not incorporated directly in the main chain of the polyvinyl alcohol.

The fact that the value (A–B)/(B) of the polyvinyl alcohol is large means that the polyvinyl alcohol contains a large amount of monomer units having excess silyl groups. On the other hand, the fact that the value (A–B)/(B) of the polyvinyl alcohol is small means that the amount of the monomer units having excess silyl groups, the units not being incorporated directly in the main chain of the polyvinyl alcohol, is small.

If the value (A–B)/(B) is too large, it is expected that a large number of siloxane bonds (—Si—O—Si—) will be formed between monomer units having excess silyl groups and silyl group-containing monomer units incorporated in the main chain of the polymer. Therefore, in such a case, it is also expected that the molecular mobility of the polyvinyl alcohol may be restricted and, therefore, the viscosity stability of an aqueous solution of the polyvinyl alcohol may be lowered.

If the value (A–B)/(B) is too small, it is expected that the proportion of the siloxane bonds (—Si—O—Si—) to be formed between monomer units having excess silyl groups and silyl group-containing monomer units incorporated in the main chain of the polymer will be small and, as a result, the water resistance of a film will be poor.

The (A–B)/(B) preferably ranges from 1/100 to 70/100, more preferably from 5/100 to 60/100, and even more preferably from 7/100 to 50/100. If the (A–B)/(B) is larger than 75/100, the viscosity stability of the aqueous anti-fouling agent of the present invention will be poor. Moreover, the film formability achieved when a film is formed by applying and then drying the anti-fouling agent to the wall of a polymerization reactor will be poor and the effect of suppressing the adhesion of scale on the wall of a polymerization reactor will be reduced. On the other hand, if the (A–B)/(B) is smaller than 0.2/100, the water resistance of a film will be reduced when the film is formed through application of an anti-fouling agent to the wall of a polymerization reactor.

The method for adjusting the value (A–B)/(B) of the polyvinyl alcohol used in the present invention is not particularly restricted. One of the methods which the inventors recommend is a method comprising dissolving a polyvinyl alcohol in water, the polyvinyl alcohol being obtained by saponifying said polyvinyl ester, subsequently neutralizing a remaining saponification catalyst, and then subjecting to a heat treatment in an organic solvent.

Examples of a solvent to be used suitably for the heat treatment include lower alcohol and lower fatty acid ester. Particularly, it is preferable to use a lower alcohol in view of the rate of the reaction and the ease of controlling the reaction. Among lower alcohols, alcohols having 3 or less carbon atoms are preferred. Specifically, methanol, ethanol, 1-propanol and 2-propanol are preferable. Methanol and ethanol are more preferable. Methanol is even more preferable. Among lower fatty acid esters, preferred are fatty acid esters resulting from dehydration between alcohol having 3 or less carbon atoms and carboxylic acid having 3 or less carbon atoms. Specifically, methyl acetate, ethyl acetate, methyl propionate and ethyl propionate are preferable. Methyl acetate and ethyl acetate are more preferable. Methyl acetate is even more preferable.

Moreover, it is desirable to use a mixed solvent of a lower alcohol and a lower fatty acid ester as the solvent for the heat treatment. When the mixed solvent is used, there is no particular limitation on the mixing ratio of the lower alcohol and the lower fatty acid ester. The lower alcohol/lower fatty acid ester weight ratio is preferably from 25/75 to 99.99/0.01, more preferably from 50/50 to 99.95/0.05, and even more preferably from 75/25 to 99.9/0.1. In comparison to use of methanol as a solvent, use of the mixed solvent is advantageous in that the rate of reaction can be controlled easier through control of the mixing ratio of the mixed solvent and therefore it is easy to adjust the (A–B)/(B) value. In particular, this advantage will contribute greatly to the production in industrial scale. These solvents may contain a small amount of water, alkali or acid.

Moreover, when conducting the heat treatment, one may apply the heat treatment to a wet polyvinyl alcohol immediately after the neutralization following the saponification, or alternatively may apply the heat treatment to a polyvinyl alcohol dried after the neutralization following the saponification. From the viewpoint of the rate of reaction and the ease of controlling the reaction, it is preferable to apply heat treatment to a wet polyvinyl alcohol immediately after the neutralization following the saponification.

Treatment conditions for the heat treatment may be selected arbitrarily depending, for example, on the conversion achieved when vinyl ester monomers and silyl group-having monomers are copolymerized, the degree of polymerization of a polyvinyl ester obtained by the copolymerization, and the degree of saponification of a polyvinyl alcohol obtained by saponifying the polyvinyl ester.

As regards the mixing ratio of the polyvinyl alcohol and the solvent in the heat treatment, it is desirable to use the solvent in an amount of from 1 to 20 times the weight of solid polyvinyl alcohol. The amount of the solvent used is preferably from 3 to 15 times, more preferably from 5 to 12 times the weight of the polyvinyl alcohol.

The temperature when conducting the heat treatment is desirably from 40 to 100° C. For increasing the rate of reaction and the productivity, the reaction temperature is preferably 40° C. or higher, more preferably 50° C. or higher, and even more preferably 60° C. or higher. On the other hand, from the viewpoint of preventing an excessive advancement of the reaction, it is desirable for the temperature during the heat treatment not to become higher than 100° C. Moreover, from the viewpoint of the quality stability in industrial production, it is particularly desirable to heat under the condition where the solvent used in the heat treatment is refluxed.

The heat treatment time is preferably from 30 minutes to 10 hours. The heat treatment time is preferably 45 minutes or more, and more preferably one hour or more. On the other hand, the heat treatment time is preferably 8 hours or less, more preferably 6 hours or less, and even more preferably 4 hours or less.

The anti-fouling agent of the present invention comprises an aqueous solution obtained by dissolving the above-described specific polyvinyl alcohol in water. There is no particular limitation on the concentration of the aqueous solution, but it is preferably from 0.1 to 10% by weight from the viewpoint of workability when applying the aqueous solution to the inner wall of a polymerization reactor. From the viewpoint of shortening the drying time required after the application of the aqueous solution and forming a uniform film on the inner wall of a polymerization reactor, the concentration of the aqueous solution is preferably 0.5% by weight or higher, more preferably 1% by weight or higher, even more preferably 2% by weight or higher, and still more preferably 3% by weight or higher. Unless the effect of the present invention is affected, the aqueous solution may contain a small amount of organic solvent. However, from the viewpoint of working environment, it is desirable for the aqueous solution to contain substantially no organic solvent.

When preparing the aqueous solution, it is desirable to prepare it under alkaline conditions using a base such as sodium hydroxide, potassium hydroxide, ammonia and ammonium hydroxide. Sodium hydroxide and potassium hydroxide are preferred as the base from the viewpoint of reduction in environmental load during the drying step following the application of the aqueous solution. In addition, the aqueous solution preferably has a pH of 9 or higher from the viewpoint of viscosity stability of the aqueous solution.

The method for applying the anti-fouling agent to the inner wall of a polymerization reactor is not particularly restricted. For example, conventional methods are available such as brush coating, dip coating and spray coating. In the case of coating a large polymerization reactor, spray coating is preferably used from the viewpoint of workability. In spray coating, the solvent is required to have a higher fluidity in comparison to brush coating or dip coating. As is clear from the following Examples, the anti-fouling agent of the present invention exhibits an extremely high fluidity when the aqueous solution has a pH of 10 or higher, preferably 11 or higher, and more preferably 12 or higher. As a result, the inner wall of a polymerization reactor coated with the anti-fouling agent of the present invention can inhibit the adhesion of scales very effectively.

For securing a long-term storage stability of the aqueous solution and a fluidity thereof at the time of spray coating, the aqueous solution preferably has a pH of 14 or lower, more preferably 13.5 or lower.

The method for preparing the aqueous solution is not particularly restricted. For example, available are a method in which a predetermined amount of the polyvinyl alcohol and the base are mixed in a lump with water and a method in which the base is dissolved in water and then the polyvinyl alcohol is added in a lump or in installments. For shortening the dissolving time and obtaining a homogeneous solution, it is desirable to dissolve the substances by heating under stirring when preparing the aqueous solution.

The amount of the anti-fouling agent of the present invention to be applied to the inner wall of a polymerization reactor is not particularly limited, but it is desirably from 0.001 to 5 g/m$^3$ in terms of the weight the polyvinyl alcohol. The polymerization reactor having an inner wall to which the anti-fouling agent of the present invention has been applied is desirably subjected to drying treatment before its use for polymerization. The method of drying is not particularly restricted and may be, for example, a method in which hot air is circulated and a method in which the polymerization reactor is heated using a jacket or the like. For obtaining a homogeneous film, the method in which a polymerization reactor is heated by a jacket or the like is suitable. The drying temperature is also not particularly limited. However, it is preferably not lower than 40° C., more preferably not lower than 50° C. from the viewpoint of forming a film having a high strength. From the viewpoint of inhibiting coloring of the anti-fouling agent and reducing the adverse effect on the hue of the polymer formed in the polymerization reactor, the drying temperature is preferably not higher than 100° C., and more preferably not higher than 90° C. The anti-fouling agent of the present invention has a good film formability and, therefore, it can form a film at a lower temperature in comparison to conventional products. From such a viewpoint, the present invention is of great significance.

The drying time is also not particularly limited and may be appropriately determined depending, for example, on the size of the polymerization reactor, the amount of the anti-fouling agent to be applied, the concentration of the anti-fouling agent and the drying temperature. It is preferably from 1 minute to one hour, more preferably from 1 minute to 30 minutes. When shortening the drying time, it is possible to improve the working efficiency and to reduce the adverse effect on the hue of the polymer formed in the polymerization reactor through inhibition of coloring of the anti-fouling agent.

The method for producing a polymer using the anti-fouling agent of the present invention may be, for example, suspension polymerization, emulsion polymerization, solution polymerization, bulk polymerization and vapor phase polymerization. Examples of monomers to be used include vinyl halide such as vinyl chloride; vinyl ester such as vinyl acetate and vinyl propionate; acrylic acid, methacrylic acid and their esters and salts; maleic acid, fumaric acid and their esters and anhydrides; styrene, acrylonitrile, vinylidene chloride and vinyl ether. Especially, the anti-fouling agent of the present invention is suitable for a polymer production in which only vinyl chloride or vinyl chloride and a monomer copolymerizable therewith are subjected to suspension polymerization or emulsion polymerization in an aqueous medium.

Examples of the comonomer to be copolymerized with vinyl chloride include vinyl ester such as vinyl acetate and vinyl propionate; (meth)acrylic ester such as methyl (meth)acrylate and ethyl (meth)acrylate; α-olefin such as ethylene and propylene; unsaturated dicarboxylic acid such as maleic anhydride and itaconic acid; acrylonitrile, styrene, vinylidene chloride, vinyl ether, and other monomers copolymerizable with vinyl chloride.

Examples of the polymerization initiator to be used for the polymerization include organic peroxides such as benzoyl peroxide, lauroyl peroxide, octyl peroxydicarbonate, acetylcyclohexylsulfonyl peroxide and azo compounds such as 2,2'-azobisisobutyronitrile and 2,2'-azobis(2,4-dimethylvaloronitrile). A redox system comprising a combination of peroxide and a reducing agent is also available.

In suspension polymerization, various additives may be added to a polymerization system. Examples of the additives include polymerization regulators such as aldehydes, halogenated hydrocarbons and mercaptans; and polymerization inhibitors such as phenol compounds, sulfur compounds, and N-oxide compounds. Moreover, pH regulators, crosslinking agents and the like may also be added, if needed. Two or more of the above-mentioned additives may be used in combination.

In suspension polymerization, dispersion stabilizers may be used. Examples of the dispersion stabilizers include those usually employed when a vinyl compound is suspension polymerized in an aqueous medium such as water-soluble polymers including water-soluble cellulose ethers e.g. methylcellulose, hydroxyethylcellulose, hydroxypropylcellulose and hydroxypropylmethylcellulose; water-soluble polymers e.g. polyvinyl alcohol and gelatin; oil-soluble emulsifiers such as sorbitanmonolaurate, sorbitantrioleate, glyceroltristearate, and ethylene oxide-propylene oxide block copolymer; water-soluble emulsifiers such as polyoxyethylene sorbitan monolaurate, polyoxyethylene glycerol oleate, and sodium laurate.

In suspension polymerization, the temperature of the aqueous medium is not particularly limited. Not only cool water of about 20° C. but also hot water of 90° C. or higher is suitably employed. The aqueous medium may be not only pure water but also may comprise an aqueous solution containing various kinds of additional ingredients or an aqueous medium containing organic solvents. When feeding the aqueous medium to a polymerization system, the amount thereof is required only to be an amount such that the polymerization system can be fully heated. Moreover, a polymerization reactor fitted with a reflux condenser is also preferably used in order to enhance the heat removal efficiency.

EXAMPLES

The invention is described in more detail with reference to the following Examples and Comparative Examples. Unless otherwise specifically indicated, "part" and "%" in the following Examples and Comparative Examples are all by weight.

I. Silyl Group-Containing Polyvinyl Alcohol

PVA was produced according to the method mentioned below, and the degree of saponification, the content of silyl group-having monomer units, and the silicon atom content were determined.

[Degree of Saponification of PVA]

The degree of saponification of PVA was determined according to the method described in JIS K6726.

[Content of the Silyl Group-Having Monomer Units of PVA]

A polyvinyl ester before saponification was purified through reprecipitation from hexane-acetone so that unreacted monomers having a silly group were completely removed from the polymer. Then, the resulting polymer was dried under reduced pressure at 90° C. for 2 days, and then dissolved in $CDCl_3$ to yield a sample for analysis. The sample was analyzed using a 500 MHz $^1$H-NMR spectrometer (JEOL GX-500), to determine the content of silyl group-having monomer units of PVA.

[Method for Determining Silicon Atom Content of PVA]

The silicon atom content of PVA is determined by the use an ICP spectrophotometer IRIS AP manufactured by Jarrell-Ash Co., Ltd., according to the method described above.

PVA-1

Into a 100-liter reactor equipped with a stirrer and a temperature sensor, 2450 parts of vinyl acetate (VAc), 1050 parts of methanol (MeOH) and 18.4 parts of vinyltrimethoxysilane (VMS) were fed. The atmosphere in the reactor was replaced with nitrogen under stirring and then the temperature of the reaction system was increased to 60° C. 0.8 parts of 2,2'-azobisisobutyronitrile (AIBN) was added to the reaction system to initiate polymerization. The polymerization was continued along with a continuous addition of 125 parts of methanol containing 1% of vinyltrimethoxysilane. Then, the polymerization was stopped when four hours had elapsed since the start thereof. When the polymerization was stopped, the solid concentration in the system was 30.8%. Next, methanol vapor was introduced into the system to expel the unreacted vinyl acetate monomer. This gave a methanol solution containing polyvinyl ester at a concentration of 40%.

To the methanol solution containing polyvinyl ester at a concentration of 40%, methanol and a methanol solution containing sodium hydroxide at a concentration of 10% were added in this order under stirring so that the molar ratio of sodium hydroxide to the vinyl acetate units in the polyvinyl ester would become 0.025 and the concentration of solid polyvinyl ester would become 25%. Then, saponification of the polyvinyl acetate was started at 40° C.

When six minutes had elapsed since the addition of methanol solution containing the sodium hydroxide, a gel was generated. Immediately after the generation of the gel, it was separated from the reaction system by filtration and then was ground in a mixer. The resulting ground product was left stand in the air at 25° C. to allow the saponification to proceed. When one hour had elapsed since the start of the saponification, the ground product was moved to another reactor and then methyl acetate of a weight twice the ground product was added thereto to neutralize the saponification catalyst. After the addition of methyl acetate, stirring was continued for one hour and then the ground product was separated by filtration. Thus, silyl group-containing polyvinyl alcohol (solid content: 92%) swollen with methanol was obtained.

The silyl group-containing polyvinyl alcohol resulting from the saponification was subjected to heat treatment according to the method below. 100 parts of the resulting silyl group-containing polyvinyl alcohol swollen with methanol (solid content: 92 parts) was moved into a reactor fitted with a reflux condenser. And then 600 parts, which corresponds to 6.5 times the weight of the solid of the silyl group-containing polyvinyl alcohol, of a mixed solvent consisting of methanol and methyl acetate in a weight ratio of 90/10 were added thereto.

Then, the reactor was heated and the heat treatment was conducted at 65° C. for one hour. During the treatment, the solvent was refluxed by heating. After the heat treatment, the solvent was removed by filtration and the residue was dried at 65° C. for 16 hours, resulting in a silyl group-containing polyvinyl alcohol (PVA-1).

The sily group-containing polyvinyl alcohol (PVA-1) had a vinyltrimethoxysilane unit content of 0.50 mole %, a degree of saponification of 98.5 mole % and a degree of polymerization of 1700. The value (A−B)/(B) was 12/100, which was determined by the previously mentioned method for analyzing the content of silicon atoms in PVA.

PVA-2 to PVA-15

PVA-2 to PVA-15 were obtained by methods the same as that for the preparation of PVA-1 except varying the kind of silyl group-having monomer, the amounts of vinyl acetate, methanol and silyl group-having monomer to be fed, the amount of polymerization initiator to be used, the condition for consecutive addition of silyl group-having monomers, and the heat treatment condition as shown in Table 1. Note that as regards PVA-13, the heat treatment was not conducted and only filtration was conducted after stirring at 30° C. for 30 minutes.

Example 1

Into a 1-liter separable flask equipped with a stirrer and a reflux condenser, 93 parts of water and 2 parts of sodium hydroxide were fed. Under stirring, 5 parts of the silyl group-containing polyvinyl alcohol (PVA-1) prepared by the method described above was added and the inner temperature was increased up to 90° C. Two hours later, the inner temperature was reduced to 30° C. to yield a 5% aqueous PVA solution. The aqueous PVA solution had a pH of 13. The resulting aqueous solution was evaluated for the viscosity stability, the water resistance of its film, the amount of scale depositing to a polymerization reactor and the amount of foreign substance contaminating a polyvinyl chloride when being used as an anti-fouling agent according to the methods shown below. Note that the viscosity stability of an aqueous PVA solution was evaluated using a 8% aqueous PVA solution prepared in a similar manner. The results are shown in Table 2.

Examples 2 to 16

Using PVA-1 to PVA-10, aqueous solutions were prepared in a manner the same as Example 1 except varying the composition of aqueous solution as shown in Table 2. Each of the resulting aqueous solutions was evaluated for the viscosity stability, the water resistance of its film, the amount of scale depositing to a polymerization reactor and the amount of foreign substance contaminating a polyvinyl chloride when being used as an anti-fouling agent in a manner the same as Example 1. The results are summarized in Table 2.

Comparative Examples 1 to 5

Aqueous solutions were prepared in a manner the same as Example 1 except using PVA-11 to PVA-15. Each of the resulting aqueous solutions was evaluated for the viscosity stability, the water resistance of its film, the amount of scale depositing to a polymerization reactor and the amount of foreign substance contaminating a polyvinyl chloride when being used as an anti-fouling agent in a manner the same as Example 1. The results are summarized in Table 2.

[Viscosity Stability of Aqueous PVA Solution]

An 8% aqueous PVA solution was prepared and was left stand in a thermostatic bath at 10° C. The viscosity of the aqueous PVA solution was measured just after the temperature of the solution reached 10° C. and seven days later. The quotient of the viscosity measured seven days later divided by the viscosity measured just after the temperature of the aqueous PVA solution reached 10° C. (7 days later/just after) was determined and judgment was made according to the following criteria:
  A: less than 1.5,
  B: not less than 1.5, but less than 2.5,
  C: not less than 2.5, but less than 4.0,
  D: not less than 4.0, but PVA has not been gelated, and
  E: PVA has lost its fluidity to gelate.

[Water Resistance of Film]

A 5% aqueous PVA solution was cast at 20° C. to form a film having a thickness of 40 µm. The film was heat treated at 120° C. for 10 minutes and then cut into a size of 10 cm in length and 10 cm in width to yield a specimen. The specimen was immersed in distilled water at 20° C. for 24 hours and then was taken out. The moisture adhering on the surface thereof was wiped off and the weight of the specimen in the water-swollen state was measured. The specimen whose weight in the water-swollen state was measured was dried at 105° C. for 16 hours and then the weight in the dry state was measured. The quotient of the weight in the water-swollen state divided by the weight in the dry state was calculated and was used as a degree of swelling. Judgment was made according to the following criteria:
  A: less than 5.0,
  B: not less than 5.0, but less than 8.0,
  C: not less than 8.0, but less than 12.0,
  D: not less than 12.0, but a specimen after immersion in distilled water was able to be taken out, and
  E: a specimen after immersion in distilled water was not able to be taken out.

[Application to the Inside of Polymerization Reactor]

A 5% aqueous PVA solution was applied by spraying onto the inner wall of a 100-liter glass-lined autoclave. Thereafter, it was dried at a jacket temperature of 60° C. for five minutes and then washed fully with water. The application quantity was 0.3 g/m$^2$ in terms of solid content.

[Suspension Polymerization of Vinyl Chloride]

40 parts of an aqueous solution containing 0.075% by weight of dispersion stabilizer dissolved in deionized water and 0.04 parts of a 70% diisopropylperoxydicarbonate solution in toluene were fed into the glass-lined autoclave coated with the anti-fouling agent. The dispersion stabilizer was an unmodified PVA having a polymerization degree of 2000 and a degree of saponification of 80 mole %. The oxygen in the system was subsequently removed by degassing the autoclave to 0.0067 MPa. Then, 30 parts of vinyl chloride monomer was fed and the system was heated to 57° C. under stirring to conduct polymerization. At the start of the polymerization, the pressure in the autoclave was 0.83 MPa. When seven hours had elapsed since the start of the polymerization and the pressure had reached 0.44 MPa, the polymerization was stopped. The unreacted vinyl chloride monomer was purged and the content was taken out. Then, the inner wall of the autoclave was washed lightly with water.

[Amount of Scale Deposition]

After a polymer slurry was taken out from a polymerization reactor, the condition of scale deposition inside the polymerization reactor was visually observed and judged according to the following criteria:
  A: no deposition of polymer scale was found,
  B: almost no deposition of polymer scale was found,
  C: polymer scale was found on the inner wall of the polymerization reactor,
  D: much polymer scale was found on the inner wall of the polymerization reactor, and
  E: a great amount of polymer scale was found on the inner wall of the polymerization reactor.

[Amount of Foreign Substance into Polyvinyl Chloride]

A polymer slurry was dried at 65° C. Then, 100 g of polyvinyl chloride was spread on a sheet of Kent paper and the number of foreign substances was visually counted.
  A: Less than one.
  B: Not less than one but less than 3.
  C: Not less than 3 but less than 5.
  D: Not less than 5.

TABLE 1

| | | Initial Feeding | | | | Consecutive Addition VMS | | Heat Treatment | | |
|---|---|---|---|---|---|---|---|---|---|---|
| | | VAc (part) | MeOH (part) | VMS (part) | AIBN (part) | Concentration (wt %) | Amount (part) | Solvent-Polymer Ratio *1) | Temperature (° C.) | Heating Time (hour) |
| Examples | | | | | | | | | | |
| 1, 9-14 | PVA-1 | 2450 | 1050 | 18.4 | 0.8 | 1 | 125 | 6.5 | 65 | 1 |
| 2 | PVA-2 | 1200 | 1800 | 36.7 | 1.5 | 2 | 193 | 6.5 | 60 | 3 |
| 3 | PVA-3 | 2450 | 1050 | 11 | 0.8 | 0.5 | 150 | 10 | 65 | 5 |
| 4 | PVA-4 | 1200 | 1800 | 36.7 | 1.5 | 2 | 193 | 15 | 65 | 8 |
| 5 | PVA-5 | 1200 | 1800 | 114.79 | 2 | 5 | 240 | 5 | 60 | 1 |
| 6 | PVA-6 | 2400 | 800 | 92.1 | 0.5 | 3 | 161 | 4 | 55 | 0.5 |
| 7 | PVA-7 | 2400 | 800 | 92.1 | 0.5 | 3 | 161 | 4 | 45 | 0.5 |
| 8 | PVA-8 | 2400 | 800 | 92.1 | 0.5 | 3 | 161 | 4 | 105 | 0.5 |
| 15 | PVA-9 | 2700 | 300 | AMS *2) 25.5 | 2 | 0 | 0 | 6.5 | 65 | 1 |
| 16 | PVA-10 | 2450 | 1050 | AMPS *3) 1.8 | 0.8 | AMPS *3) 10 | AMPS *3) 150 | 6.5 | 65 | 1 |
| Comparative Examples | | | | | | | | | | |
| 1 | PVA-11 | 2450 | 1050 | 3.7 | 0.7 | 0.3 | 83 | 6.5 | 65 | 1 |
| 2 | PVA-12 | 2450 | 1050 | 234.4 | 1.3 | 6 | 262 | 6.5 | 60 | 3 |
| 3 | PVA-13 | 2450 | 1050 | 18.4 | 0.8 | 1 | 125 | — | — | — |
| 4 | PVA-14 | 2400 | 600 | 29 | 0.5 | 1 | 109 | 15 | 65 | 12 |
| 5 | PVA-15 | 2450 | 1050 | — | 0.7 | — | — | 6.5 | 65 | 1 |

*1) Weight ratio of the solvent to the PVA (solid) swollen with methanol
*2) Allyltrimethoxysilane (AMS)
*3) 2-Acrylamido-2-methylpropyltrimethoxysilane (AMPS)

TABLE 2

| | | Specification of PVA | | | | | Composition of Aqueous Solution | |
|---|---|---|---|---|---|---|---|---|
| | PVA used | S *1) (mole %) | Degree of Polymerization P | P × S | Degree of Saponification (mole %) | (A − B)/(B) | PVA *2) (part) | Water *2) (part) |
| Examples | | | | | | | | |
| 1 | PVA-1 | 0.5 | 1700 | 850 | 98.5 | 12/100 | 5(8) | 93(90) |
| 2 | PVA-2 | 2 | 500 | 1000 | 98 | 20/100 | 5(8) | 93(90) |
| 3 | PVA-3 | 0.3 | 1700 | 510 | 98.5 | 5/100 | 5(8) | 93(90) |
| 4 | PVA-4 | 2 | 500 | 1000 | 98 | 0.8/100 | 5(8) | 93(90) |
| 5 | PVA-5 | 6 | 500 | 3000 | 98 | 60/100 | 5(8) | 93(90) |
| 6 | PVA-6 | 2.5 | 2000 | 5000 | 98.5 | 70/100 | 5(8) | 93(90) |
| 7 | PVA-7 | 2.5 | 2000 | 5000 | 98.5 | 75/100 | 5(8) | 93(90) |
| 8 | PVA-8 | 2.5 | 2000 | 5000 | 98.5 | 10/100 | 5(8) | 93(90) |
| 9 | PVA-1 | 0.5 | 1700 | 850 | 98.5 | 12/100 | 5(8) | 95(92) |
| 10 | PVA-1 | 0.5 | 1700 | 850 | 98.5 | 12/100 | 5(8) | 95(92) |
| 11 | PVA-1 | 0.5 | 1700 | 850 | 98.5 | 12/100 | 5(8) | 95(92) |
| 12 | PVA-1 | 0.5 | 1700 | 850 | 98.5 | 12/100 | 0.5(8) | 97.5(92) |
| 13 | PVA-1 | 0.5 | 1700 | 850 | 98.5 | 12/100 | 1.5(8) | 96.5(90) |
| 14 | PVA-1 | 0.5 | 1700 | 850 | 98.5 | 12/100 | 12(8) | 86(90) |
| 15 | PVA-9 | 0.5 | 1700 | 850 | 98.5 | 11/100 | 5(8) | 93(90) |
| 16 | PVA-10 | 0.5 | 1700 | 850 | 98.5 | 10/100 | 5(8) | 93(90) |
| Comparative Examples | | | | | | | | |
| 1 | PVA-11 | 0.1 | 1700 | 170 | 98.5 | 12/100 | 5(8) | 93(90) |
| 2 | PVA-12 | 6 | 1700 | 10200 | 98 | 20/100 | 5(8) | 93(90) |
| 3 | PVA-13 | 0.5 | 1700 | 850 | 98.5 | 85/100 | 5(8) | 93(90) |
| 4 | PVA-14 | 0.8 | 2500 | 2000 | 98 | 0.05/100 | 5(8) | 93(90) |
| 5 | PVA-15 | 0 | 1700 | 0 | 98.5 | — | 5(8) | 93(90) |

TABLE 2-continued

| | NaOH (part) | pH of Aqueous Solution | Viscosity Stability | Water Resistance of Film | Amount of Scale | Contamination of Hard Spots into Polymer |
|---|---|---|---|---|---|---|
| Examples | | | | | | |
| 1 | 2 | 13 | A | A | A | A |
| 2 | 2 | 13 | A | A | A | A |
| 3 | 2 | 13 | A | B | B | A |
| 4 | 2 | 13 | A | B | C | B |
| 5 | 2 | 13 | B | A | B | A |
| 6 | 2 | 13 | B | A | C | B |
| 7 | 2 | 13 | C | A | C | B |
| 8 | 2 | 13 | A | B | C | B |
| 9 | 0.02 | 11 | B | A | B | B |
| 10 | 0.002 | 10 | B | B | B | B |
| 11 | 0.0002 | 9 | C | B | C | C |
| 12 | 2 | 13 | A | B | B | B |
| 13 | 2 | 13 | A | A | B | B |
| 14 | 2 | 13 | A | A | B | B |
| 15 | 2 | 13 | A | A | A | A |
| 16 | 2 | 13 | A | A | A | A |
| Comparative Examples | | | | | | |
| 1 | 2 | 13 | A | D | D | C |
| 2 | 2 | 13 | D | B | D | C |
| 3 | 2 | 13 | D | B | D | C |
| 4 | 2 | 13 | B | D | D | C |
| 5 | 2 | 13 | B | E | E | D |

*1) Content of silyl group-having monomer units
*2) Numbers in parentheses indicate mixing ratios used in evaluation of viscosity stability.

Tables 1 and 2 show that in Examples 1 to 16, in which the PVAs have a silyl group and satisfy formulae (I) and (II), the aqueous solutions are superior in viscosity stability and water resistance of films formed therefrom and can inhibit the deposition of scale and the contamination of hard spots into a polymer formed. On the other hand, in Comparative Example 1, in which P×S is too small, the water resistance of the film is insufficient. In Comparative Example 2, in which P×S is too large, the viscosity stability of the aqueous solution is insufficient. In Comparative Example 3, in which (A−B)/(B) is too large, the viscosity stability of the aqueous solution is insufficient. In Comparative Example 4, in which (A−B)/(B) is too small, the water resistance of the film is insufficient. In Comparative Example 5, in which PVA having no silyl group was used, the water resistance of the film is quite insufficient. Thus, in Comparative Examples 1 to 5, the inhibition of the adhesion of scale and the contamination of hard spots into a polymer formed was achieved insufficiently.

What we claim is:

1. A method for producing a polymer comprising polymerization in a polymerization reactor having an inner wall covered with an anti-fouling agent comprising an aqueous solution having a pH of 9 or greater and containing a polyvinyl alcohol obtained through saponification of a polyvinyl ester that contains monomer units having a silyl group of formula (1):

wherein $R^1$ represents an alkyl group having from 1 to 5 carbon atoms; $R^2$ represents an alkoxyl or acyloxyl group optionally having an oxygen-containing substituent; and m indicates an integer of from 0 to 2, wherein the polyvinyl alcohol satisfies the following formulae (I) and (II):

$$370 < P \times S < 9000 \quad (I)$$

wherein P indicates the viscosity-average degree of polymerization of the polyvinyl alcohol, and S indicates the content (mole %) of the monomer units having a silyl group of formula (1) in the polyvinyl alcohol;

$$0.2/100 \leq (A-B)/(B) \leq 75/100 \quad (II)$$

wherein A indicates the content (ppm) of silicon atoms in the polyvinyl alcohol, and B indicates the content (ppm) of silicon atoms in the polyvinyl alcohol that was washed with sodium hydroxide-containing methanol and then washed with methanol by Soxhlet extraction, wherein A and B are measured by ICP emission spectrometry after ashing of a sample.

2. The method according to claim 1, wherein the aqueous solution has a pH of from 10 to 14.

3. The method according to claim 1, wherein the content of the polyvinyl alcohol is from 0.1 to 10% by weight.

4. The method according to claim 1, wherein the aqueous solution is prepared by dissolving the polyvinyl alcohol in water.

5. The method according to claim 4, wherein the polyvinyl alcohol and a base are dissolved in water.

6. The method according to claim 1, wherein the polyvinyl alcohol is obtained by saponifying the polyvinyl ester, subsequently neutralizing a remaining saponification catalyst, and then subjecting to a heat treatment in an organic solvent.

7. The method according to claim 6, wherein the organic solvent is used in an amount of from 1 to 20 times the weight of polyvinyl alcohol during the heat treatment.

8. The method according to claim 6, wherein the organic solvent is a mixed solvent of a lower alcohol and a lower fatty acid ester.

9. The method according to claim 6, wherein the treatment temperature is from 40° C. to 100° C. and the treatment time is from 30 minutes to 10 hours in the heat treatment.

10. The method according to claim 1, wherein the polymerization is suspension polymerization or emulsion polymerization.

11. The method according to claim 1, wherein the polymer is polyvinyl chloride.

* * * * *